United States Patent
Ries et al.

(10) Patent No.: US 9,442,552 B2
(45) Date of Patent: Sep. 13, 2016

(54) REGULATING THE ACTIVITY OF A CORE

(75) Inventors: Gilles Ries, Saint-Jean de Moirans (FR); Abdelaziz Goulahsen, Coublevie (FR)

(73) Assignee: ST-Ericsson SA, Plan-les-Ouates (CH)

( * ) Notice: Subject to any disclaimer, the term of this patent is extended or adjusted under 35 U.S.C. 154(b) by 314 days.

(21) Appl. No.: 14/343,175

(22) PCT Filed: Sep. 6, 2012

(86) PCT No.: PCT/EP2012/067425
§ 371 (c)(1),
(2), (4) Date: Mar. 24, 2014

(87) PCT Pub. No.: WO2013/034646
PCT Pub. Date: Mar. 14, 2013

(65) Prior Publication Data
US 2014/0223211 A1    Aug. 7, 2014

Related U.S. Application Data

(60) Provisional application No. 61/537,760, filed on Sep. 22, 2011.

(30) Foreign Application Priority Data

Sep. 6, 2011  (EP) ..................................... 11306108

(51) Int. Cl.
*G06F 1/26* (2006.01)
*G06F 1/32* (2006.01)
*G06F 1/20* (2006.01)
*G06F 11/00* (2006.01)

(52) U.S. Cl.
CPC ............. *G06F 1/3206* (2013.01); *G06F 1/206* (2013.01); *G06F 1/324* (2013.01); *G06F 1/3296* (2013.01); *G06F 11/00* (2013.01); *Y02B 60/1217* (2013.01)

(58) Field of Classification Search
CPC ...... G06F 1/206; G06F 1/3206; G06F 1/324; G06F 1/3296; G06F 11/00
USPC ........................................ 713/300, 320, 322
See application file for complete search history.

(56) References Cited

U.S. PATENT DOCUMENTS

| | | | |
|---|---|---|---|
| 5,978,864 A * | 11/1999 | Hetherington | G06F 1/206 710/18 |
| 2002/0140467 A1 * | 10/2002 | Naffziger | G06F 1/3203 327/113 |
| 2006/0066376 A1 * | 3/2006 | Narendra | G06F 1/06 327/292 |
| 2006/0161375 A1 | 7/2006 | Duberstein et al. | |
| 2007/0150765 A1 | 6/2007 | Ochiai | |
| 2007/0156370 A1 | 7/2007 | White et al. | |

* cited by examiner

Primary Examiner — Michael J Brown
(74) Attorney, Agent, or Firm — Coats & Bennett, P.L.L.C.

(57) ABSTRACT

It is proposed a method for regulating the activity of a core running at a given clock rate. The method comprises: monitoring (S100) a value of a parameter of the core, the parameter being a critical parameter for a safe operating of the core; determining whether the monitored value reaches a trigger value; when the monitored value reaches the trigger value (S120): modifying the clock rate of the core (S130) by decreasing the ratio of active cycles of the clock; and running the core at the clock rate modified (S140) by decreasing the ratio of active cycles of the clock; when the monitored value reaches a second time the trigger value (S170): modifying the clock rate of the core (S180) by increasing the ratio of active cycles of the clock; and running the core at the clock rate (S190) modified by increasing the ratio of active cycles of the clock.

11 Claims, 3 Drawing Sheets

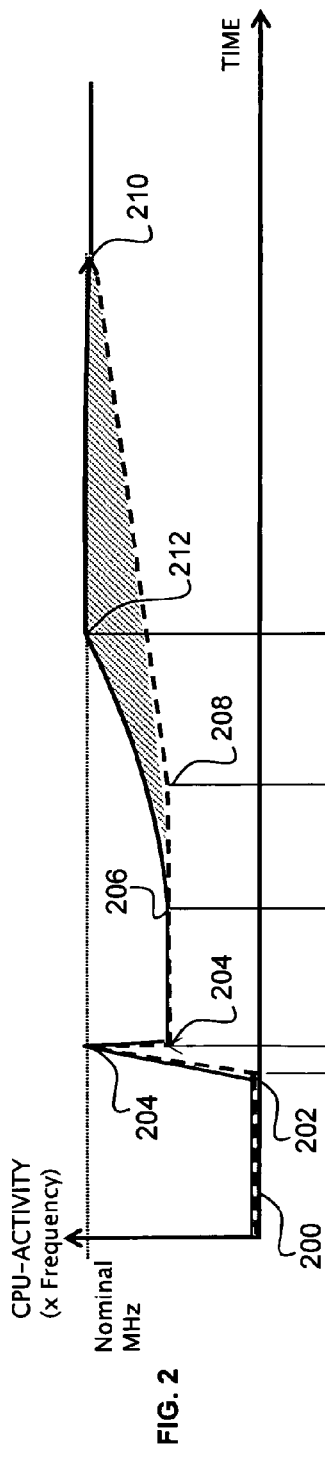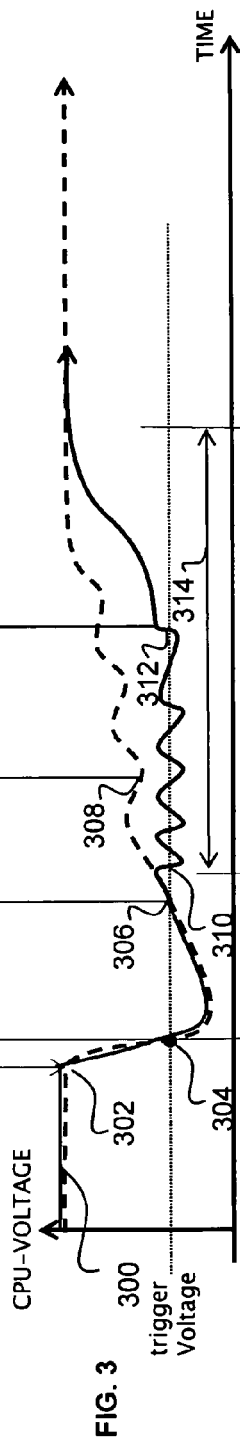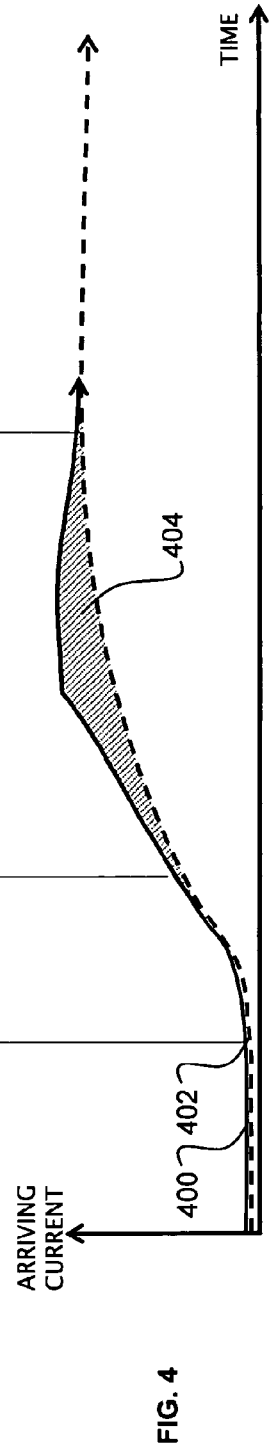

REGULATING THE ACTIVITY OF A CORE

FIELD OF THE INVENTION

The invention relates to regulating circuits, and particularly to regulating the activity of a core running a given clock rate.

BACKGROUND OF THE INVENTION

Cores and modules of cores, like CPU (Central Processing Unit) or GPU (Graphics Processing Unit) have varying internal activities. The variations of the internal activity may be the result of stops due to cache refills, re-activation after the trigger of interrupt or a start of a task, or varying intensities of tasks.

The varying activities creates varying current consumption in the cores, and thus varying local core voltage that may rises or drops before the power supply of the core can compensate the current variation.

These rise and drop of voltage must remain under control, as a too high voltage or too low voltage might crash the Core. For instance, this may lead to critical path violation, either in Hold or in Setup.

In addition, the cores and modules of cores may be subjected to an over-activity when the intensities of tasks to be processed by the CPU or GPU are too important. This over-activity creates an increase of the temperature of the core or the module of the core that may also lead to its crash, and even its physical destruction.

In order to prevent a crash due to a too low voltage or a too high temperature, several systems exist that try to slow the rise of the power consumption of the core or limit the increase of the core temperature, by tuning its frequency or else. These systems use techniques that use progressive activation of the cores or the module of a core, like providing a rising clock frequency.

These systems require an external trigger to be started for tuning the frequency and slow the rise of the activity. The external trigger can be of different kind, like a manual trigger, for instance a software activation, or automatic.

The issue with such techniques is that during the rising period, the core is slowed down, and as a result, its performances suffer: the more conservative the slowed-down period, the more performance is lost. In addition, automatic triggering techniques may trigger the slowing-down mechanism unexpectedly, and create a temporary slow-down until the system converges again.

There is a need for a solution permitting to regulate the activity of a module of a core while limiting slow-down of the core.

SUMMARY OF THE INVENTION

An object of embodiments of the present invention is to alleviate at least partly the above mentioned drawbacks. More particularly, embodiments of the invention aim at improving the way the activity of a core is regulated.

This is achieved with a method for regulating the activity of a core running at a given clock rate. The method comprises monitoring a value of a parameter of the core, the parameter being a critical parameter for a safe operating of the core. The method further comprises determining whether the monitored value reaches a trigger value. The method also comprises, when the monitored value reaches the trigger value, modifying the clock rate of the core by decreasing the ratio of active cycles of the clock, and running the core at the clock rate modified by decreasing the ratio of active cycles of the clock. The method also comprises, when the monitored value reaches a second time the trigger value, modifying the clock rate of the core by increasing the ratio of active cycles of the clock, and running the core at the clock rate modified by increasing the ratio of active cycles of the clock.

That the clock rate of the core is modified by decreasing and then increasing the ratio of active cycles of the clock according to monitored value of a parameter of the core has the effect that it is created a reaction loop.

Embodiments of the invention offer many advantages, including the following:
- auto-adaptability to a varying condition that allows to react smoothly to a smooth variation of a monitored value of a parameter of the core, thus having a reduced impact on general performance of the core. It avoids the drawbacks of open-loop mechanism that triggers a full reaction, whether the core faces a small or a large variation of a monitored value of a parameter of the core, with uselessly high performance drops for a minor case;
- optimal core performance, that is, with minimal performances reductions.

This is also achieved with a computer program product comprising a computer readable medium, having thereon a computer program comprising program instructions, the computer program being loadable into a data-processing unit and adapted to cause execution of the method when the computer program is run by the data-processing unit.

This is also achieved with a data storage medium having recorded thereon a computer program comprising instructions for performing the method.

This is also achieved with a system for regulating the activity of a module of a core running at a given clock rate. The system comprises a sensor adapted to monitor a value of a parameter of the core, the parameter being a critical parameter for a safe operating of the core, and determine whether the monitored value reaches a trigger value. The system also comprises a clock-gating module operatively coupled with the core and adapted to modify the clock rate of the core by decreasing the ratio of active cycles of the clock and run the core at the clock rate modified by decreasing the ratio of active cycles of the clock when the sensor has determined that the monitored value has reached the trigger value. The clock-gating module is further adapted to modify the clock rate of the core by increasing the ratio of active cycles of the clock and run the core at the clock rate modified by increasing the ratio of active cycles of the clock when the sensor has determined that the monitored value has reached a second time the trigger value.

This is also achieved with a processing unit with at least one core integrating the system.

The processing unit may be a central processing unit or a graphics processing unit, or any other.

In addition, the method of the invention may comprise, when the monitored value reaches the trigger value, the steps of modifying the clock rate and clock rating the core with the modified clock rate are repeated until the monitored value reaches the second time the trigger value.

Furthermore, the method of the invention may comprise that the repetition of the steps of modifying the clock rate and clock rating the core with the modified clock rate until the monitored value reaches the second time the trigger value comprises counting a number of cycles carried out by the clock of the core that runs at the clock rate modified by decreasing the ratio of active cycles of the clock, modifying the clock rate by, once more, decreasing the ratio of active cycles of the clock when the number of cycles counted reaches a predetermined value and running the core at the clock rate modified by, once more, decreasing the ratio of active cycles of the clock.

Additionally, the method of the invention may comprise, when the monitored value reaches the second time the trigger value, the ratio of active cycles of the clock is increased to the full ratio of active cycles of the clock.

Moreover, the method of the invention may comprise the parameter of the core is one among a voltage, a temperature.

In addition, the method of the invention may comprise the trigger value is dynamically determined according to at least one of the following: the decrease of the ratio of active cycles of the clock, the increase of the ratio of active cycles of the clock, a reaction time between the determining step and the clock rating step.

Moreover, the system of the invention may comprises a counter operatively coupled with the core and adapted to count a number of cycles carried out by the clock of the core that runs at the clock rate modified by decreasing the ratio of active cycles of the clock, and wherein the clock-gating module is further adapted to modify the clock rate by decreasing again the ratio of active cycles of the clock when the number of cycles counted by the counter reaches a predetermined value, running the core at the clock rate modified by again decreasing the ratio of active cycles of the clock.

In addition, the system of the invention may comprise the sensor is a voltage sensor operatively coupled to the core for monitoring the voltage of the core.

Alternatively, the system of the invention may comprise the sensor is a temperature sensor operatively coupled to the core for monitoring the temperature of the core.

Further features and advantages of embodiments of the invention will appear from the following description of some embodiments of the invention, given as non-limiting examples, with reference to the accompanying drawings listed hereunder.

BRIEF DESCRIPTION OF THE DRAWINGS

FIGS. 2 to 4 show graphics depicting comparison between a voltage-gating regulator as known in the art and a voltage-gating regulator in accordance with an embodiment of the invention.

DETAILED DESCRIPTION OF EMBODIMENTS OF THE INVENTION

Figure 1:
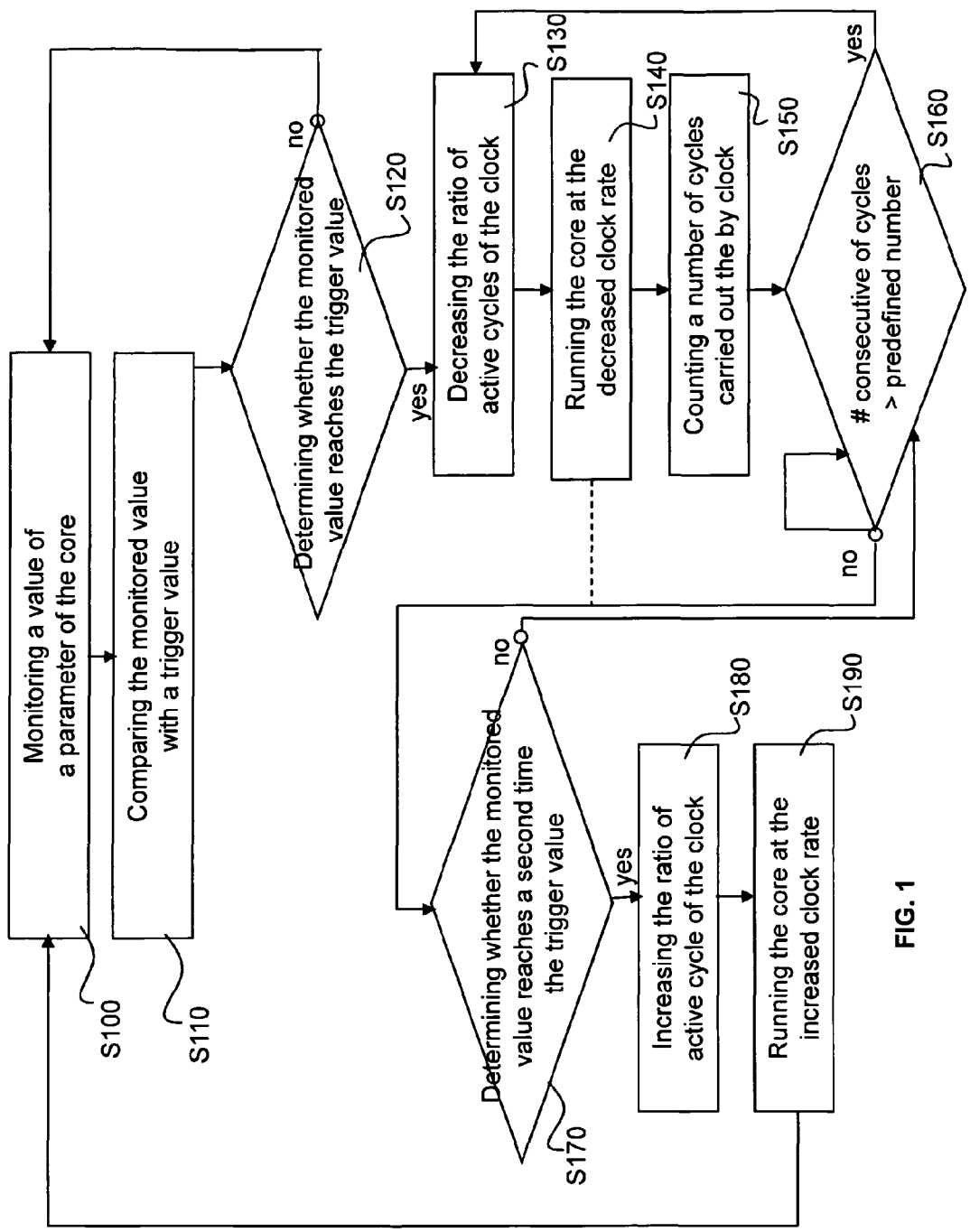
FIG. 1 shows a flowchart of a method for regulating the activity of a core in accordance with an embodiment of the invention.

It is referred to FIG. 1 which shows a flowchart of a method for regulating the activity of a core running at a given clock rate in accordance with an embodiment of the invention. By core it is meant an electronic circuit (also referred to as electronic chip) large enough, relative to other components, to be worth a specific circuitry to handle its power integrity, for instance the consumption and the dissipation of the core. Typically, a core may be implemented on, but not limited to, a central processing unit (CPU) or a graphics processing unit (GPU). It is to be understood that the method may be implemented on a CPU or GPU comprising one or more cores, e.g. a multi-core CPU. It is also to be understood that the method may be implemented on one or several modules of a core. A module of a core is a functional block of the core that performs a specific function. The terms clock rate refer to the rate in cycles per second or the frequency (measured in hertz) of the clock in any synchronous electronic circuit, e.g. a CPU or GPU. Thus, the core is run (or oscillates) at a given frequency. Regulating the activity of a core means that the usage of the core is adjusted, e.g. by maintaining at least one parameter of the core above or below a given level. The method comprises monitoring a value of a parameter of the core. Typically, the parameter is a critical parameter for a safe operating of the core. In other terms, the monitored parameter is a parameter whose variations must remain above or below a given level in order to avoid a crash or even a physical destruction of the core. The method further comprises determining whether the monitored value reaches a trigger value. The trigger value is a value that, once reached by the monitored value, involves the initiating of a reaction for regulating the activity of the core. The determination may be performed by a comparison between the monitored value and the trigger value. When the monitored value reaches the trigger value, the clock rate of the core is modified by decreasing the ratio of active cycles of the clock, and the core is run at the clock rate modified by decreasing the ratio of active cycles of the clock. When the monitored value reaches a second time (or again) the trigger value, the clock rate of the core is modified by increasing the ratio of active cycles of the clock, and the core then runs at the clock rate modified by increasing the ratio of active cycles of the clock.

Thus, the method allows an adaptive scheme wherein, in case of too important variation of a critical parameter, the active clock cycles of the core clock are reduced so that the critical parameter is keep at an acceptable level, thus avoiding the crash of the core. In case the critical parameter keeps or reaches again a level considered as acceptable (that is, the core can perform its task with out crashing), no active clock cycles are suppressed so that the core can deliver its full performances. The method thus provides auto-adaptability to any varying parameter the core, especially to any critical parameter of the core. In addition, the method provides optimal core performance, that is, with minimal performances low.

At step S100, a value of a parameter of the module of the core is monitored. It is to be understood that the monitoring may concern one or several cores. Monitoring the value of a parameter means that a scaled analogue or digital signal that represents the real-time available state of the parameter is checked. Typically, the monitored parameter value may be, but is not limited to, the voltage of the module of the core, the temperature of the module of the core; the voltage and the temperature are indeed critical parameters that must remain in acceptable levels in order to avoid a defect of the core.

At step S110, the monitored value is compared with a trigger value. The trigger value is a threshold (or trigger threshold) that determines when the activity of the core has to be regulated. The trigger value is thus a trigger threshold from which the value of a critical parameter has to be maintained at an acceptable level. More precisely, the trigger value is selected slightly close to a critical value that causes the crash of the core when this critical value is reached.

For instance, if the critical parameter is the voltage of the core, the monitored value of the parameter is the real-time available voltage of module of the core, and the trigger value (or trigger voltage) is a voltage chosen so that it is sufficiently above the voltage for which the core crashes. As another example, if the critical parameter is the temperature of the core, the monitored value of the parameter is the real-time available temperature of the core, and the trigger value (or trigger temperature) is a temperature chosen so that it is sufficiently below the temperature for which the core crashes.

Next, at step S120, it is determined whether the monitored value reaches the trigger value, as a result of the comparing step S110. In other words, it is checked whether the monitored value is below or exceeds the trigger threshold defined by the trigger value. For instance, if the monitored parameter is the voltage of the core, it is determined whether the value representative of the voltage of the core drops below a voltage threshold. As another example, if the monitored parameter is the temperature of the core, it is determined whether the value representative of the temperature of the core exceeds a temperature threshold.

In the event the monitored value reaches the trigger value, steps S130-160 of the method are carried out. In the event the trigger value is not reached by the monitored value, the steps S100 to S120 are repeated.

At steps S130, the clock rate of the core is modified as a result of the determination (or detection) that the monitored value has reached the trigger value. The modification of the clock scheme of the core is carried out by decreasing the ratio of active cycles of the clock. This amounts to say that the clock rate of the core is decreased by decreasing the ratio of active cycles of the clock. One could also say that the clock rate of the core is decreased. An active cycle is a period of time during which the core performs at least one instruction. Thus, active cycles are suppressed, and a new regular clock is recreated, usually at a rational ratio to ease an implementation with clock-gating, but not necessarily.

Next, at step S140, the core is run at the modified clock rate, that is, a new regular clock recreated at step S130 is sent to the core.

A typical example of ratio is to suppress one active cycle of the clock every two cycles. For instance, if one cycle every two is suppressed, this results to the creation of a halved frequency clock. It is to be understood that any ratio may be contemplated. In practice, the frequency reduction should be set to give compromise between a low enough frequency that ensures that the core with its reduced frequency is correctly regulated, and a high enough frequency, that avoids to impact too much the performances of the system. Among others, the recreated clock should preserve a duty-cycle of 50%-50%, that is, 50% of the active cycles are suppressed. For instance, the clock signals would look the next:

the initial clock is Hi-Lo-Hi-Lo,
an easily badly clock-gated gives: Hi-Lo-Lo-Lo
a good 50% duty cycle gated clock gives: Hi-Hi-Lo-Lo So, while the monitored value reaches the critical value, a clock that has a HiHiLoLo-HiHiLoLo-HiHiLoLo sequence is generated, that is in fact a halved-frequency clock.

At this step of the method, the core is run at a reduced frequency.

Next, at step S150, it is counted a number of cycles carried out the by the clock of the core that runs at the clock rate modified by decreasing the ratio of active cycles of the clock. The counting starts once the core is run at the reduced frequency and is performed while the number of cycle does not reach a predetermined value or until it is determined that the monitored value reaches a second time (or again) the trigger value. In practice, the counter is reset to zero when the counting starts, and the predetermined value is a positive real number.

Then, at step S160, it is determined whether the number of cycle reaches the predetermined value. It is to be understood that the determination is continuously performed. When the number of cycle reaches the predetermined value, the steps S130 to S160 are repeated. This means that the ratio of active cycles of the clock is decreased again in order to provide a new modified clock rate. It is to be understood that the new modified clock rate is lower that the former one. The core is then run at the new modified clock rate. In addition, the counter may be reset to zero when a new decrease of the ratio is performed.

Thus, thanks to the repetitions of the step S130 to S160 (if any), the ratio of active cycles of the clock of the core is progressively lowered, and as a result of the successive decreases of the ratio of active cycles, the monitored value reaches again the trigger value. Advantageously, this allows to improve auto-adaptability to any varying parameter the core (especially to any critical parameter of the core), including technologic production variations, while provides optimal core performance, that is, with minimal performances low.

In alternative, the predetermined value may be dynamically determined according to the current ratio of active cycles of the clock of the core. By this way, it is possible to refine a bit further the decreasing of the ratio of active cycles.

Alternatively, the counter may be a timer counting a time elapsed between the current time and the time at which the core is run at the modified clock rate. It this case, when a predetermined time has elapsed and the monitored value has not reached a second time (or again) the trigger value, the steps S130 to S160 are repeated until the monitored value reaches a second time the trigger value. Similarly, when the counter is a timer, the predetermined time may be dynamically determined according to the current ratio of active cycles of the clock of the core. Again, this allows to refine the decrease of the ratio of active cycles.

In an alternative, the steps S150 and S160 may not be implemented. Therefore, while the monitored value of the parameter reaches the trigger value, that is, while the monitored value remains above or below the threshold defined by the trigger value, the core runs continuously at the modified clock rate of step S130. In practice, the ratio of active cycles of the core should be selected sufficiently low in order to ensure that the frequency is reduced enough for restoring the core in a stable state, typically a ratio of one of two of the active cycles may be used.

Next, at step S170, it is determined whether the monitored value reaches a second time the trigger value. This amounts to say that the monitored value reaches again or another time the trigger value. In other term, it is tested whether the monitored value of the critical parameter has currently an acceptable level. If this is not the case, then the core continues to run at the modified clock rate of steps S130-160. If the critical parameter is tested as having an acceptable level, the ratio of active cycle of the clock is increased (S180), and the core is then run at the clock rate modified by increasing the ratio of active cycles of the clock (S190). This amounts to say that the clock rate of the core is increased by increasing the ratio of active cycles of the clock. One could also say that the clock rate of the core is increased.

Any ratio of active cycle of the clock may be selected when increased. In practice, the ratio of active cycles of the clock is increased to the full ratio of active cycles of the clock, that is, all the active cycles of the clock are reestablished. Advantageously, this allows the core to work at its best capacities, that is, the core is fully active.

At this step, the method may be repeated in order to ensure that the critical parameter remains at an acceptable level, that is, above or under a trigger value. It is to be understood that the monitoring of the value of the parameter of the core may be a continuous process, which involves that there is no interruption in determining whether the monitored value reaches or reaches a second time (or again) the trigger value.

As a result, the method according to the invention advantageously creates a reaction loop providing auto-adaptability to varying condition, for instance:

silicon variations, like production corner cases, etc. . . .
silicon aging: characterisation evolution, . . . ,
device variation: bulk voltage, . . .
core variations, like local voltage or temperature Indeed, the frequency sent to the core is adapted according to the monitored value of the parameter (e.g. the voltage of the core), which in turn modify the power consumption of the core because the power consumption is mainly a function of the frequency. It is to be noted that the power consumption of the core is also function of internal perturbation that are unknown and may be caused by the start or the stop of an internal process, an evolution from a slow process to a faster one, and so on. In turn, the modification of the power consumption modifies the voltage of the core which is a delayed function of the power consumption of the core (by various non-linear behaviour of the electric supply of the core). Similarly, the modification of the power consumption modifies the temperature of the core which is a delayed function of the power consumption of the core. Therefore, the method creates a loop-back of a monitored value to control the frequency sent to the core. This will be apparent in the discussion of FIGS. 2-4 below.

The trigger value may be a predetermined value, e.g. a voltage threshold or a temperature threshold. Alternatively, the trigger value may be dynamically determined according to at least one intrinsic condition of the core such as the current clock rate, the decreased or increased ratio of active cycles of the clock, a reaction time between the determining step and the clock rating step. Advantageously, this makes it possible to refine when the regulation of the core has to be triggered. Generally, the definition of the trigger value is a compromise between the stability of the core (provided by an early trigger) and the performance of the core (provided by a late trigger).

In addition, the transition between the current clock rate to the modified clock rate of the core (after a decrease or an increase of the ratio of active cycles) may depend on a reaction time. The reaction time may be defined as a number of cycles of the core that elapsed between the point in time at which the monitored value reaches the trigger value (S120) or reaches a second time the trigger value (S170), and the point in time at which the core is run at the modified (decreased or increased) clock rate. The reaction time should be should be designed to be as fast as possible to allow the frequency reduction to act as fast as possible after a triggered voltage drop. Indeed, an increased reaction time leads to have an earlier trigger of the regulation of the core.

It is now referred to FIGS. 2 to 4 that show graphics depicting comparison between a voltage-gating regulator as known in the art and a voltage-gating regulator in accordance with an embodiment of the invention. The curves relative to the method known in the art are shown in doted lines, and the curves relative to an embodiment of the present invention are shown in plain lines.

On FIG. 2, for both methods, the CPU has an initial activity which is low 200 until an interrupt occurs on the CPU 202. The interrupt causes a rise of the frequency of the core 204 so that the interrupt can be processed by the core. The rise of the frequency of the core causes a drop 304 of the voltage from a nominal level 300-302, as shown on FIG. 3. Simultaneously, the rise of the frequency of the core further causes a variation of the current arriving at the core as depicted on FIG. 4: the consumption of current is low 400 while the CPU has a low frequency and increases 402 when the frequency rises.

Referring now to FIG. 3, the voltage drops and reaches a trigger value 304, here a trigger voltage. At this point, in both methods, the frequency of the core is reduced of 50%. In other words, one of two of the active cycles of the clock of the core is suppressed. This is illustrated on FIG. 2: the point 204 corresponds to the point in time at which the frequency of the clock of the core is reduced, that is, the point in time 304 on FIG. 3 at which the trigger value is reached by the monitored voltage.

The method as known in the art keeps the frequency reduced during a period which starts at point 204 and ends at point 208. This period comprises several cycle of the clock, e.g. 1000 cycles. It is noticeable that the frequency is kept reduced even if the voltage of the core has reached a second time the voltage trigger; indeed, the voltage of the core reaches the trigger value only between points 304-308 on FIG. 3. Then, as shown on FIG. 2, the frequency of the core rises slowly from point 208 until it reaches its nominal value on point 210. Meanwhile, the voltage of the core rises progressively until it reaches its nominal value. However, the nominal value of the voltage is reached before the frequency reaches its nominal value. In other term, the core does not recover its full capacity even if its voltage is no more close from the trigger voltage. As a result, performances of the CPU are reduced despite the fact that the critical parameter (here the voltage of the CPU) is at an acceptable level.

Discussing now the method for regulating the activity of the core according to an embodiment of the invention, the monitored value (the voltage of the core) reaches a second time the trigger value at point 306 on FIG. 3, which leads to modifying the clock rate of the core by increasing the ratio of active cycles of the clock and clock rating the core with the clock rate modified by increasing the ratio of active cycles of the clock. Then, at point 310, it is determined that the monitored value reaches the trigger value. As a result, the ratio of active cycles of the core is decreased and the core is another time run at a reduced frequency. Consequently, the voltage of the core increases and reaches again the trigger value so that the core is run at a clock rate modified by increasing the ratio of active cycles of the clock. The ratio of active cycle is decreased and increased successively according to the value of the monitored voltage of the core: the method according to the invention is repeated several times until the voltage is definitively above the trigger voltage. It results from the repetition of the method that the voltage of the core oscillates around the trigger value until the voltage is definitively above the trigger voltage. However, the voltage of the core falls slower and slower and rises faster and faster, til recovery at point 312. During the oscillation phase 314 on FIG. 3, the voltage oscillates around the trigger value (the trigger voltage). The low voltage guaranties that the current pumped from the last capacitance of the current source of the core and arriving at the core is maximal. Referring now to FIG. 4, the plain line shows that the arriving current to the core is more important with the method according to the invention that with the method known in the art, as emphasized by the hatched area 404. Therefore, as the arrival of current is maximal, the performances are maximal, and an interrupt causing the rise of the frequency of the core can be processed more quickly. In fact, the frequency and the activity of the core rise as fast as the current, thus providing maximal performances for the core.

Figure 5:
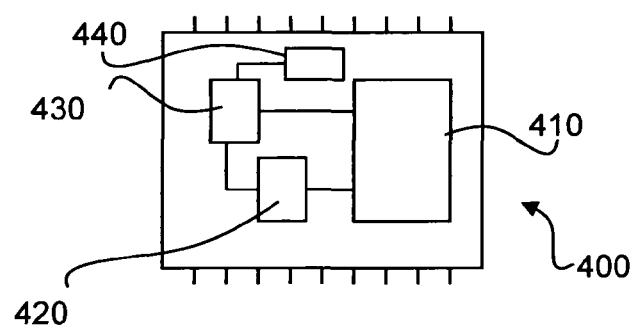
FIG. 5 shows a block diagram illustrating an exemplary configuration of a central processing unit in accordance with an embodiment of the invention.

Referring now to FIG. 5, an exemplary configuration of a CPU in accordance with an embodiment of the invention is discussed. The CPU 400 may comprise a core 410. The CPU may further comprise a sensor 420 operatively coupled with the core and adapted to monitor a value of a parameter of the core. The sensor may also be implemented on the core. The sensor may be able to operate a comparison between the monitored value and a trigger value for determining whether the monitored value reaches a trigger value. The CPU may comprise a clock-gating module 430 operatively coupled with the core and adapted to increase or decrease the ratio of active cycles of the clock for modifying the clock rate of the core. The clock-gating module may be also adapted to run the core at the modified clock rate. The clock-gating module may be operatively coupled with the sensor so that the sensor may transmit to the clock-gating module the monitored value and or the result of the determination whether or not the monitored value reaches a trigger value. The CPU may also comprise a counter 440 able to count a number of cycles of the clock of the core. The counter may be implanted on the CPU and operatively coupled with the clock-gating module. The counter may also be implemented by the clock-gating module. The clock-gating module may be implemented by logical gates on the CPU. It is to be understood that this advantageously limits the area required on the CPU for implementing the clock-gating module. Furthermore, the clock-gating module may comprise the sensor. It is therefore possible to put the sensor and the clock-gating module very close to the core it-self, thus allowing to obtain better measures of the sensors.

The method may be performed based on a computer program comprising instructions for performing the method. The program may be executable on a programmable device. The application program may be implemented in a high-level procedural or object-oriented programming language, or in assembly or machine language if desired. In any case, the language may be a compiled or interpreted language. The program may be a full installation program, or an update program. In the latter case, the program is an update program that updates a programmable device, previously programmed for performing parts of the method, to a state wherein the device is suitable for performing the whole method.

The program may be recorded on a data storage medium. The data storage medium may be any memory adapted for recording computer instructions. The data storage medium may thus be any form of non volatile memory, including by way of example semiconductor memory devices, such as EPROM, EEPROM, and flash memories.

The invention has been described with reference to preferred embodiments. However, many variations are possible within the scope of the invention.

The invention claimed is:

1. A method for regulating the activity of a core running at a given clock rate, the method comprising:
   monitoring an operating voltage of the core;
   determining whether the monitored voltage value reaches a trigger voltage value;
   when the monitored voltage value reaches the trigger voltage value:
      modifying the clock rate of the core by decreasing the ratio of active cycles of the clock; and
      running the core at the clock rate modified by decreasing the ratio of active cycles of the clock;
   when the monitored voltage value reaches a second time the trigger voltage value:
      modifying the clock rate of the core by increasing the ratio of active cycles of the clock; and
      running the core at the clock rate modified by increasing the ratio of active cycles of the clock;
   wherein the trigger voltage value is dynamically determined according to a condition selected from the group consisting of:
      a decrease of the ratio of active cycles of the clock,
      an increase of the ratio of active cycles of the clock, and
      a reaction time between the determining step and the clock rating step.

2. The method of claim 1, wherein, when the monitored voltage value reaches the trigger value, the steps of modifying the clock rate and running the core at the modified clock rate are repeated until the monitored voltage value reaches the second time the trigger voltage value.

3. The method of claim 2, wherein the repetition of the steps of modifying the clock rate and applying to the core the modified clock rate until the monitored voltage value reaches the second time the trigger voltage value comprises:
   counting a number of cycles carried out by the clock of the core that runs at the clock rate modified by decreasing the ratio of active cycles of the clock;
   modifying the clock rate by, again, decreasing the ratio of active cycles of the clock when the number of cycles counted reaches a predetermined value;
   running the core at the clock rate modified by, again, decreasing the ratio of active cycles of the clock.

4. The method of claim 1, wherein, when the monitored voltage value reaches the second time the trigger voltage value, the ratio of active cycles of the clock is increased to the full ratio of active cycles of the clock.

5. A system for regulating the activity of a core running at a given clock rate, the system comprising:
   a sensor adapted to monitor an operating voltage of the core, and to determine whether the monitored voltage value reaches a trigger voltage value;
   a counter operatively coupled with the core and adapted to count a number of cycles carried out by the clock of the core that runs at the clock rate modified by decreasing the ratio of active cycles of the clock; and
   a clock-gating module operatively coupled with the core and adapted to:
      modify the clock rate of the core by decreasing the ratio of active cycles of the clock and run the core at the clock rate modified by decreasing the ratio of active cycles of the clock when the sensor has determined that the monitored voltage value has reached the trigger voltage value or when the number of cycles counted by the counter reaches a predetermined value; and
      modify the clock rate of the core by increasing the ratio of active cycles of the clock and run the core at the clock rate modified by increasing the ratio of active cycles of the clock when the sensor has determined that the monitored voltage value has reached a second time the trigger voltage value.

6. A processing circuit comprising at least one core and a system for regulating the activity of the core running at a given clock rate, comprising:
- a sensor adapted to monitor an operating voltage of the core, and to determine whether the monitored value voltage reaches a trigger voltage value;
- a counter operatively coupled with the core and adapted to count a number of cycles carried out by the clock of the core that runs at the clock rate modified by decreasing the ratio of active cycles of the clock; and
- a clock-gating module operatively coupled with the core and adapted to:
  - modify the clock rate of the core by decreasing the ratio of active cycles of the clock and run the core at the clock rate modified by decreasing the ratio of active cycles of the clock when the sensor has determined that the monitored voltage value has reached the trigger voltage value or when the number of cycles counted by the counter reaches a predetermined value; and
  - modify the clock rate of the core by increasing the ratio of active cycles of the clock and run the core at the clock rate modified by increasing the ratio of active cycles of the clock when the sensor has determined that the monitored voltage value has reached a second time the trigger voltage value.

7. A non-transitory computer readable medium containing a computer program comprising program instructions, the computer program being loadable into a data-processing circuit and adapted to cause execution of the following steps when the computer program is executed by the data-processing circuit:
- monitoring an operating voltage of a core;
- determining whether the monitored voltage value reaches a trigger voltage value;
- when the monitored voltage value reaches the trigger voltage value:
  - modifying the clock rate of the core by decreasing the ratio of active cycles of the clock; and
  - running the core at the clock rate modified by decreasing the ratio of active cycles of the clock;
- when the monitored voltage value reaches a second time the trigger voltage value:
  - modifying the clock rate of the core by increasing the ratio of active cycles of the clock; and
  - running the core at the clock rate modified by increasing the ratio of active cycles of the clock;
- wherein the trigger voltage value is dynamically determined according to a condition selected from the group consisting of:
  - a decrease of the ratio of active cycles of the clock,
  - an increase of the ratio of active cycles of the clock, and
  - a reaction time between the determining step and the clock rating step.

8. A method for regulating the activity of a core running at a given clock rate, the method comprising:
- monitoring a value of a parameter of the core, the parameter being a critical parameter for a safe operating of the core;
- determining whether the monitored value reaches a trigger value;
- when the monitored value reaches the trigger value:
  - modifying the clock rate of the core by decreasing the ratio of active cycles of the clock;
  - running the core at the clock rate modified by decreasing the ratio of active cycles of the clock; and
- repeating the modifying and running steps until the monitored value reaches a second time the trigger value, by
  - counting a number of cycles carried out by the clock of the core that runs at the clock rate modified by decreasing the ratio of active cycles of the clock;
  - modifying the clock rate by, again, decreasing the ratio of active cycles of the clock when the number of cycles counted reaches a predetermined value;
  - running the core at the clock rate modified by, again, decreasing the ratio of active cycles of the clock; and
- when the monitored value reaches a second time the trigger value:
  - modifying the clock rate of the core by increasing the ratio of active cycles of the clock; and
  - running the core at the clock rate modified by increasing the ratio of active cycles of the clock.

9. The method of claim 8, wherein the parameter of the core is selected from the group consisting of a voltage and a temperature.

10. The method of claim 8, wherein the trigger value is dynamically determined according to a condition selected from the group consisting of
- a decrease of the ratio of active cycles of the clock,
- an increase of the ratio of active cycles of the clock, and
- a reaction time between the determining step and the clock rating step.

11. A system for regulating the activity of a core running at a given clock rate, the system comprising:
- a sensor adapted to monitor a value of a parameter of the core, the parameter being a critical parameter for a safe operating of the core, and to determine whether the monitored value reaches a trigger value;
- a clock-gating module operatively coupled with the core and adapted to:
  - modify the clock rate of the core by decreasing the ratio of active cycles of the clock and run the core at the clock rate modified by decreasing the ratio of active cycles of the clock when the sensor has determined that the monitored value has reached the trigger value; and
  - modify the clock rate of the core by increasing the ratio of active cycles of the clock and run the core at the clock rate modified by increasing the ratio of active cycles of the clock when the sensor has determined that the monitored value has reached a second time the trigger value;
- a counter operatively coupled with the core and adapted to count a number of cycles carried out by the clock of the core that runs at the clock rate modified by decreasing the ratio of active cycles of the clock; and
- wherein the clock-gating module is further adapted to:
  - modify the clock rate by decreasing again the ratio of active cycles of the clock when the number of cycles counted by the counter reaches a predetermined value;
  - running the core at the clock rate modified by again decreasing the ratio of active cycles of the clock.

* * * * *